US012686465B2

(12) United States Patent (10) Patent No.: US 12,686,465 B2
Oishi et al. (45) Date of Patent: Jul. 21, 2026

(54) DETECTION SYSTEM, DETECTION METHOD, AND COMPUTER-READABLE STORAGE MEDIUM

(71) Applicant: SHIMANO INC., Sakai City (JP)

(72) Inventors: Toshinari Oishi, Sakai City (JP); Koujirou Morii, Sakai City (JP); Keiichi Higashihara, Sakai City (JP)

(73) Assignee: SHIMANO INC., Sakai (JP)

( * ) Notice: Subject to any disclaimer, the term of this patent is extended or adjusted under 35 U.S.C. 154(b) by 322 days.

(21) Appl. No.: 18/437,242

(22) Filed: Feb. 9, 2024

(65) Prior Publication Data

US 2025/0256804 A1 Aug. 14, 2025

(51) Int. Cl.
B62J 45/41 (2020.01)
B62J 45/412 (2020.01)
B62M 6/50 (2010.01)

(52) U.S. Cl.
CPC .............. B62M 6/50 (2013.01); B62J 45/412 (2020.02)

(58) Field of Classification Search
CPC . B62J 45/40; B62J 45/41; B62J 45/412; B62J 45/42; B62M 6/50
USPC ...................................................... 180/206.3
See application file for complete search history.

(56) References Cited

U.S. PATENT DOCUMENTS

| | | | | |
|---|---|---|---|---|
| 10,259,520 | B2 * | 4/2019 | Butora | B62K 25/08 |
| 10,416,186 | B2 | 9/2019 | Nichols et al. | |
| 2001/0030408 | A1 * | 10/2001 | Miyoshi | B62K 25/28 |
| | | | | 267/141 |
| 2015/0130153 | A1 * | 5/2015 | Chen | B62K 25/04 |
| | | | | 280/124.108 |
| 2018/0304952 | A1 | 10/2018 | Krugman et al. | |
| 2019/0054780 | A1 | 2/2019 | Nichols | |
| 2019/0291813 | A1 * | 9/2019 | Tsuchizawa | B60L 3/0092 |
| 2021/0197925 | A1 * | 7/2021 | Shahana | B62J 45/4152 |
| 2021/0214040 | A1 * | 7/2021 | Shahana | B62K 25/286 |
| 2023/0083770 | A1 * | 3/2023 | Kurotobi | B62J 45/20 |
| | | | | 701/2 |
| 2024/0166290 | A1 * | 5/2024 | Ooishi | B62J 45/41 |

FOREIGN PATENT DOCUMENTS

DE 102021100414 7/2022

* cited by examiner

*Primary Examiner* — Erick R Solis
(74) *Attorney, Agent, or Firm* — MORI & WARD, LLP

(57) ABSTRACT

A detection system comprises a load sensor and electronic controller circuitry. The load sensor is configured to obtain load information relating to a load applied, while a rider rides a human-powered vehicle, to a wheel of the human-powered vehicle. The electronic controller circuitry is configured to obtain, based on the load information, motion information relating to a motion of the human-powered vehicle.

19 Claims, 7 Drawing Sheets

DETECTION SYSTEM, DETECTION METHOD, AND COMPUTER-READABLE STORAGE MEDIUM

BACKGROUND

Technical Field

The present invention relates to a detection system, a detection method, and a computer-readable storage medium.

Background Information

A human-powered vehicle has various motions such as traveling forward, traveling on bumps, staying in substantially the same position while both feet of the rider are put on pedals. The human-powered vehicle includes a sensor to detect a motion of the human-powered vehicle. One of objects of the present disclosure is to improve the accuracy of motion information.

SUMMARY

In accordance with a first aspect of the present invention, a detection system comprises a load sensor and electronic controller circuitry. The load sensor is configured to obtain load information relating to a load applied, while a rider rides a human-powered vehicle, to a wheel of the human-powered vehicle. The electronic controller circuitry is configured to obtain, based on the load information, motion information relating to a motion of the human-powered vehicle.

With the detection system according to the first aspect, it is possible to obtain the motion information relating to the motion of the human-powered vehicle using the load information relating to the load applied to the wheel. Thus, it is possible to improve the accuracy of the motion information.

In accordance with a second aspect of the present invention, the detection system according to the first aspect is configured so that the load information includes air pressure information relating to an air pressure of the wheel. The load sensor is configured to obtain the air pressure information. The electronic controller circuitry is configured to obtain the motion information based on the air pressure information.

With the detection system according to the second aspect, it is possible to reliably improve the accuracy of the motion information.

In accordance with a third aspect of the present invention, the detection system according to the first or second aspect is configured so that the motion information includes a technical level of the rider. The electronic controller circuitry is configured to determine the technical level based on the load information.

With the detection system according to the third aspect, it is possible to obtain the technical level of the rider based on the load information.

In accordance with a fourth aspect of the present invention, the detection system according to the third aspect is configured so that the technical level includes a level of a standstill technique that the rider maintains balance while the human-powered vehicle remains stationary or moves only minimal distances. The electronic controller circuitry is configured to determine the level of the standstill technique based on the load information.

With the detection system according to the fourth aspect, it is possible to obtain the level of the standstill technique based on the load information.

In accordance with a fifth aspect of the present invention, the detection system according to the third or fourth aspect is configured so that the technical level includes a level of a neutral technique that the rider absorbs a bump of a road to reduce shocks applied to the wheel while the rider rides the human-powered vehicle. The electronic controller circuitry is configured to determine the level of the neutral technique based on the load information.

With the detection system according to the fifth aspect, it is possible to obtain the level of the neutral technique based on the load information.

In accordance with a sixth aspect of the present invention, the detection system according to any one of the third to fifth aspects is configured so that the load sensor includes a front load sensor and a rear load sensor. The front load sensor is configured to obtain front load information relating to a front load applied, while the rider rides the human-powered vehicle, to a front wheel of the human-powered vehicle. The rear load sensor is configured to obtain rear load information relating to a rear load applied, while the rider rides the human-powered vehicle, to a rear wheel of the human-powered vehicle. The electronic controller circuitry is configured to determine the technical level based on at least one of the front load information and the rear load information.

With the detection system according to the sixth aspect, it is possible to improve the accuracy of the technical level of the rider.

In accordance with a seventh aspect of the present invention, the detection system according to the sixth aspect is configured so that the electronic controller circuitry is configured to determine the technical level based on a load difference between the front load information and the rear load information.

With the detection system according to the seventh aspect, it is possible to reliably improve the accuracy of the technical level of the rider.

In accordance with an eighth aspect of the present invention, the detection system according to the seventh aspect is configured so that the electronic controller circuitry is configured to determine the technical level based on a change in the load difference.

With the detection system according to the eighth aspect, it is possible to reliably improve the accuracy of the technical level of the rider.

In accordance with a ninth aspect of the present invention, the detection system according to the eighth aspect is configured so that the electronic controller circuitry is configured to calculate standard deviation of the load difference. The electronic controller circuitry is configured to determine the technical level based on the standard deviation.

With the detection system according to the ninth aspect, it is possible to more reliably improve the accuracy of the technical level of the rider.

In accordance with a tenth aspect of the present invention, the detection system according to the ninth aspect is configured so that the technical level includes a first technical level and a second technical level. The electronic controller circuitry is configured to select the first technical level in a case where the standard deviation is less than a first level threshold. The electronic controller circuitry is configured to select the second technical level in a case where the standard deviation is greater than the first level threshold.

With the detection system according to the tenth aspect, it is possible to more reliably improve the accuracy of the technical level of the rider.

In accordance with an eleventh aspect of the present invention, the detection system according to any one of the third to tenth aspects is configured so that the electronic controller circuitry is configured to determine the technical level based on a change in the load information.

With the detection system according to the eleventh aspect, it is possible to reliably improve the accuracy of the technical level of the rider.

In accordance with a twelfth aspect of the present invention, the detection system according to the eleventh aspect is configured so that the load sensor includes at least one of a front load sensor and a rear load sensor. The front load sensor is configured to obtain front load information relating to a front load applied, while the rider rides the human-powered vehicle, to a front wheel of the human-powered vehicle. The rear load sensor is configured to obtain rear load information relating to a rear load applied, while the rider rides the human-powered vehicle, to a rear wheel of the human-powered vehicle. The electronic controller circuitry is configured to determine the technical level based on at least one of a change in the front load information and a change in the rear load information.

With the detection system according to the twelfth aspect, it is possible to reliably improve the accuracy of the technical level of the rider.

In accordance with a thirteenth aspect of the present invention, the detection system according to the eleventh or twelfth aspect is configured so that the technical level includes a first technical level and a second technical level. The electronic controller circuitry is configured to select the first technical level in a case where the change in the load information is less than a second level threshold. The electronic controller circuitry is configured to select the second technical level in a case where the change in the load information is greater than the second level threshold.

With the detection system according to the thirteenth aspect, it is possible to reliably improve the accuracy of the technical level of the rider.

In accordance with a fourteenth aspect of the present invention, the detection system according to any one of the first to thirteenth aspects is configured so that the motion information includes at least one of a cadence and a vehicle speed of the human-powered vehicle. The electronic controller circuitry is configured to calculate at least one of the cadence and the vehicle speed based on the load information.

With the detection system according to the fourteenth aspect, it is possible to obtain the cadence and the vehicle speed with a comparatively simple structure.

In accordance with a fifteenth aspect of the present invention, the detection system according to the fourteenth aspect is configured so that the load sensor includes a rear load sensor configured to obtain rear load information relating to a rear load applied, while the rider rides the human-powered vehicle, to a rear wheel of the human-powered vehicle. The electronic controller circuitry is configured to calculate at least one of the cadence and the vehicle speed based on the rear load information.

With the detection system according to the fifteenth aspect, it is possible to reliably obtain the cadence and the vehicle speed with a comparatively simple structure.

In accordance with a sixteenth aspect of the present invention, the detection system according to the fifteenth aspect is configured so that the rear load information includes rear air pressure information relating to a rear air pressure of the rear wheel. The rear load sensor is configured to obtain the rear air pressure information. The electronic controller circuitry is configured to calculate at least one of the cadence and the vehicle speed based on the rear air pressure information.

With the detection system according to the sixteenth aspect, it is possible to more reliably obtain the cadence and the vehicle speed with a comparatively simple structure.

In accordance with a seventeenth aspect of the present invention, the detection system according to any one of the fourteenth to sixteenth aspects is configured so that the electronic controller circuitry is configured to calculate at least one of the cadence and the vehicle speed based on a change in the load information.

With the detection system according to the seventeenth aspect, it is possible to reliably obtain the cadence and the vehicle speed with a comparatively simple structure.

In accordance with an eighteenth aspect of the present invention, the detection system according to any one of the fourteenth to seventeenth aspects is configured so that the electronic controller circuitry is configured to calculate at least one of the cadence and the vehicle speed based on a total number of peaks of the load information per unit time.

With the detection system according to the eighteenth aspect, it is possible to reliably obtain the cadence and the vehicle speed with a comparatively simple structure.

In accordance with a nineteenth aspect of the present invention, a detection method comprises: obtaining load information relating to a load applied, while a rider rides a human-powered vehicle, to a wheel of the human-powered vehicle; and obtaining, based on the load information, motion information relating to a motion of the human-powered vehicle.

With the detection method according to the nineteenth aspect, it is possible to obtain the motion information relating to the motion of the human-powered vehicle using the load information relating to the load applied to the wheel. Thus, it is possible to improve the accuracy of the motion information.

In accordance with a twentieth aspect of the present invention, a computer-readable storage medium stores program instructions for causing electronic controller circuitry to execute a detection method comprising: obtaining load information relating to a load applied, while a rider rides a human-powered vehicle, to a wheel of the human-powered vehicle; and obtaining, based on the load information, motion information relating to a motion of the human-powered vehicle.

With the computer-readable storage medium according to the first aspect, it is possible to obtain the motion information relating to the motion of the human-powered vehicle using the load information relating to the load applied to the wheel. Thus, it is possible to improve the accuracy of the motion information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
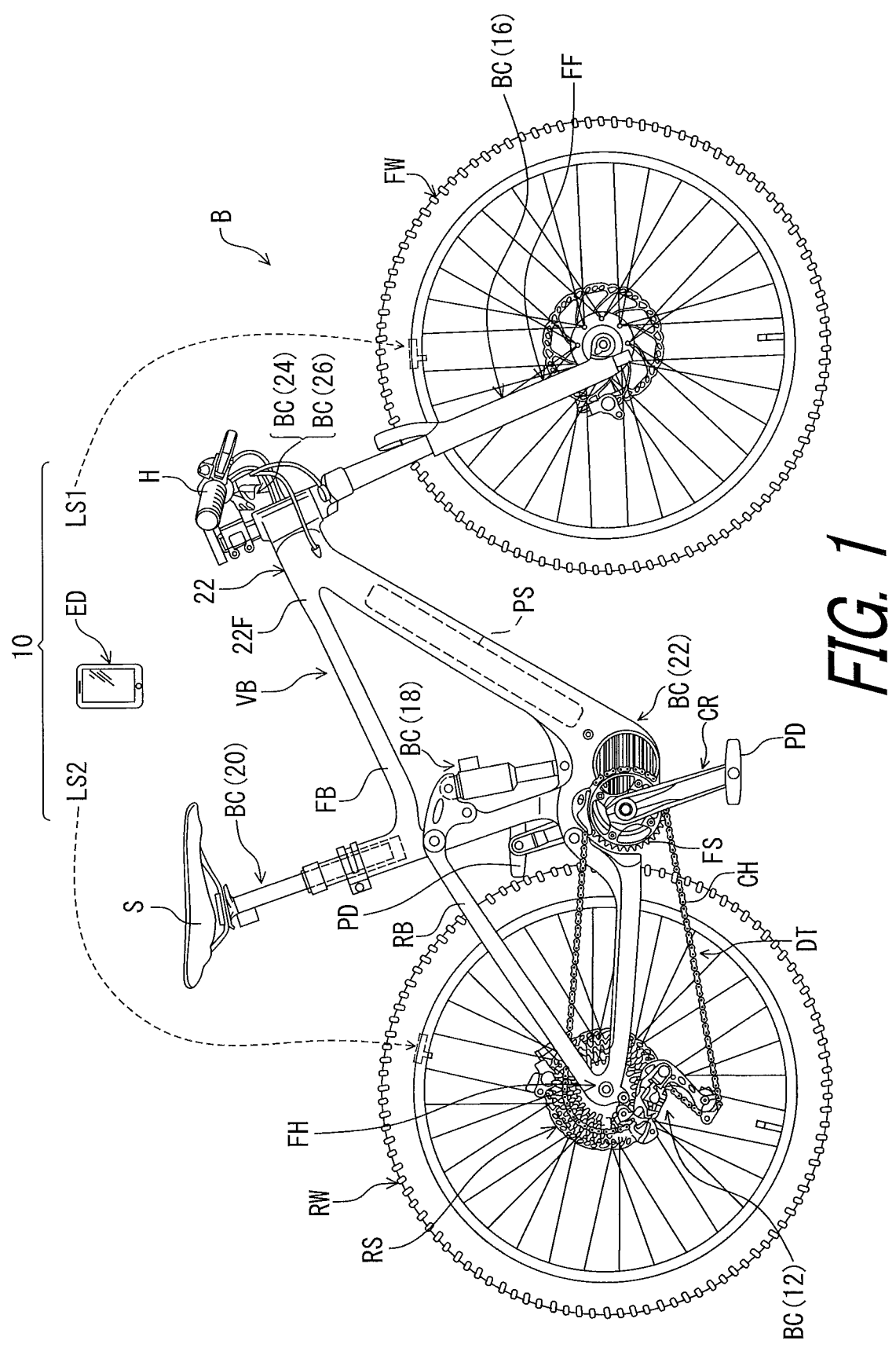
FIG. 1 is a side elevational view of a human-powered vehicle including a detection system in accordance with one of embodiments.

The embodiments will now be described with reference to the accompanying drawings, wherein like reference numerals designate corresponding or identical elements throughout the various drawings.

Referring initially to FIG. 1, a human-powered vehicle B includes a detection system 10 in accordance with one of embodiments. The human-powered vehicle B includes at least one human-powered vehicle component BC. In the present embodiment, the human-powered vehicle B is illustrated as an e-bike that uses a driving force of an electric motor in addition to a human driving force for propulsion. However, the detection system 10 can be applied to any other type of human-powered vehicles such as, for example, a mountain bike, a cyclocross bicycle, a gravel bike, a city bike, a cargo bike, and a recumbent bike.

In the present application, the term "human-powered vehicle" includes a vehicle to travel with a motive power including at least a human power of a user who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike called as an E-bike. The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only a driving source as motive power. Examples of the driving source include an internal-combustion engine and an electric motor. Generally, a light road vehicle, which includes a vehicle that does not require a driver's license for a public road, is assumed as the human-powered vehicle.

As seen in FIG. 1, the human-powered vehicle B includes a vehicle body VB, a wheel FW, and a wheel RW. The wheel FW is rotatably coupled to the vehicle body VB. The wheel RW is rotatably coupled to the vehicle body VB. The vehicle body VB is supported by the wheels FW and RW. The wheel FW can also be referred to as a front wheel FW. The wheel RW can also be referred to as a rear wheel RW.

The vehicle body VB includes a front frame body FB, a rear frame body RB, a handlebar H, and a front fork FF. The rear frame body RB includes a swing arm. The rear frame body RB is movably coupled to the front frame body FB. The rear frame body RB is pivotally coupled to the front frame body FB. The front fork FF is pivotally coupled to the front frame body FB. The handlebar H is coupled to the front fork FF to be pivotable relative to the front frame body FB along with the front fork FF.

The human-powered vehicle B further includes a drivetrain DT. Here, for example, the drivetrain DT is a chain-drive type and includes a crank CR, at least one front sprocket FS, at least two rear sprockets RS, a chain CH, and pedals PD. The crank CR is rotatably coupled to the vehicle body VB. The at least one front sprocket FS is coupled to the crank CR to rotate relative to the vehicle body VB along with the crank CR. The rear sprockets RS are provided on a hub assembly FH of the wheel RW. The chain CH is configured to be engaged with one of the at least one front sprocket FS and one of the at least two rear sprockets RS. The pedals PD are coupled to the crank CR. A human driving force is applied to the pedals PD by a rider such that the driving force is transmitted to the wheel RW via the at least one front sprocket FS, the chain CH, and the at least two rear sprockets RS. While the drivetrain DT is illustrated as a chain-drive type of drivetrain, the drivetrain DT can be selected from any type of drivetrain and can be a belt-drive type or a shaft-drive type.

In the present application, the following directional terms "front," "rear," "forward," "rearward," "left," "right," "transverse," "upward" and "downward" as well as any other similar directional terms refer to those directions which are determined based on the user who is in the user's standard position in the human-powered vehicle B while the user faces toward a handlebar or steering. Examples of the user's standard position include a saddle and a seat. Accordingly, these terms, as utilized to describe the detection system 10, the human-powered vehicle component BC, or other components, should be interpreted relative to the human-powered vehicle B equipped with the detection system 10, the human-powered vehicle component BC, or other components as used in an upright riding position on a horizontal surface.

As seen in FIG. 1, the at least one human-powered vehicle component BC includes a gear changer 12, a suspension 16, a suspension 18, an adjustable seatpost 20, and an assist drive unit 22. Namely, the human-powered vehicle B includes the gear changer 12, the suspension 16, the suspension 18, the adjustable seatpost 20, and the assist drive unit 22. The gear changer 12 is configured to be mounted to the vehicle body VB. The suspension 16 is configured to be mounted to the vehicle body VB. The suspension 18 is configured to be mounted to the vehicle body VB. The adjustable seatpost 20 is configured to be mounted to the vehicle body VB. The assist drive unit 22 is configured to be mounted to the vehicle body VB.

The gear changer 12 is configured to change a gear ratio of the human-powered vehicle B. The gear ratio is a ratio of a rotational speed of the at least two rear sprockets RS to a rotational speed of the at least one front sprocket FS. The gear changer 12 is configured to shift the chain CH relative to the at least two rear sprockets RS. In the present embodiment, the gear changer 12 includes a rear derailleur. However, the gear changer 12 can include another type of gear changer if needed or desired. Examples of another type of gear changer include a front derailleur and an internal-gear hub.

The suspension 16 is configured to absorb or damp shocks or vibrations generated by riding on rough terrain. The suspension 16 is installed in the front fork FF. The suspension 16 and the front fork FF constitute a suspension fork. The suspension 16 is configured to absorb or damp shocks or vibrations transmitted from at least one of the wheels FW and RW.

The suspension 18 is configured to absorb or damp shocks or vibrations generated by riding on rough terrain. The suspension 18 is coupled to the front frame body FB and the rear frame body RB. The suspension 18 is configured to absorb or damp shocks or vibrations transmitted from at least one of the wheels FW and RW.

The adjustable seatpost 20 is configured to change a height of the saddle S relative to the vehicle body VB. The adjustable seatpost 20 has an adjustable state and a locked state. The adjustable seatpost 20 allows the user to change the height of the saddle S in the adjustable state. The adjustable seatpost 20 is locked to maintain the height of the saddle S in the locked state. The adjustable seatpost 20 is configured to change the state of the adjustable seatpost 20 between the adjustable state and the locked state.

The assist drive unit 22 is configured to assist propulsion of the human-powered vehicle B. The assist drive unit 22 is configured to change an assist ratio depending on a human power applied to the human-powered vehicle B. For example, the assist drive unit 22 is configured to change the assist ratio depending on pedaling torque applied to the crank CR.

As seen in FIG. 1, the human-powered vehicle B includes a first operating device 24 and a second operating device 26. The first operating device 24 is configured to be mounted to the handlebar H (see e.g., FIG. 1) in a conventional manner. The first operating device 24 is configured to receive a first user operation. The first operating device 24 is configured to operate at least one of the at least one human-powered vehicle component BC in response to the first user operation. The second operating device 26 is configured to be mounted to the handlebar H (see e.g., FIG. 1) in a conventional manner. The second operating device 26 is configured to receive a second user operation. The second operating device 26 is configured to operate at least one of the at least one human-powered vehicle component BC in response to the second user operation.

The first operating device 24 is configured to operate at least one of the gear changer 12, the suspension 16, the suspension 18, the adjustable seatpost 20, and the assist drive unit 22 in response to the first user operation. The second operating device 26 is configured to operate at least one of the gear changer 12, the suspension 16, the suspension 18, the adjustable seatpost 20, and the assist drive unit 22 in response to the second user operation. The at least one human-powered vehicle component BC can include another operating device other than the first operating device 24 and the second operating device 26 if needed or desired.

The first operating device 24 is electrically connected to at least one of the gear changer 12, the suspension 16, the suspension 18, the adjustable seatpost 20, and the assist drive unit 22. The second operating device 26 is electrically connected to another of the gear changer 12, the suspension 16, the suspension 18, the adjustable seatpost 20, and the assist drive unit 22. In the present embodiment, the first operating device 24 is wirelessly connected to at least one of the gear changer 12, the suspension 16, the suspension 18, the adjustable seatpost 20, and the assist drive unit 22. The second operating device 26 is wirelessly connected to another of the gear changer 12, the suspension 16, the suspension 18, the adjustable seatpost 20, and the assist drive unit 22. However, the first operating device 24 can be electrically connected to at least one of the gear changer 12, the suspension 16, the suspension 18, the adjustable seatpost 20, and the assist drive unit 22 via an electric cable if needed or desired. The second operating device 26 can be electrically connected to another of the gear changer 12, the suspension 16, the suspension 18, the adjustable seatpost 20, and the assist drive unit 22 via an electric cable if needed or desired.

As seen in FIG. 1, the human-powered vehicle B includes an electric power source PS. Here, the electric power source PS includes a battery pack that includes one or more batteries. The electric power source PS is configured to be mounted to the vehicle body VB. For example, the electric power source PS is configured to be provided in the down-tube of the vehicle body VB. Alternatively, the electric power source PS can be attached an outer surface of the vehicle body VB. For example, the electric power source PS includes one or more rechargeable batteries.

The electric power source PS is configured to be electrically connected to at least one of the at least one human-powered vehicle component BC to supply electrical power to the at least one of the at least one human-powered vehicle component BC. The electric power source PS is configured to be electrically connected to at least one of the gear changer 12, the suspension 16, the suspension 18, the adjustable seatpost 20, the assist drive unit 22, the first operating device 24, and the second operating device 26. The electric power source PS is configured to supply electrical power to the at least one of the gear changer 12, the suspension 16, the suspension 18, the adjustable seatpost 20, the assist drive unit 22, the first operating device 24, and the second operating device 26.

Figure 2:
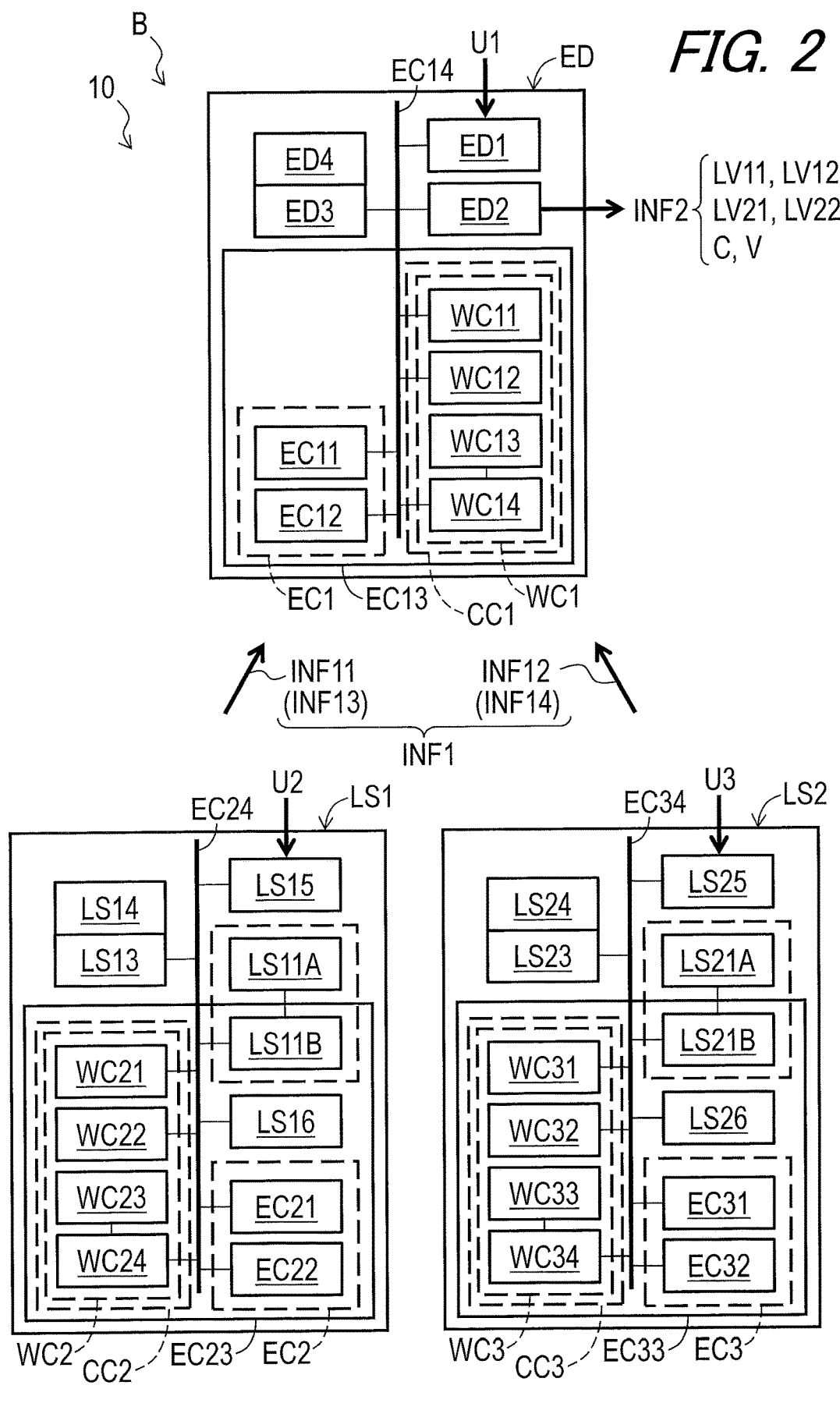
FIG. 2 is a schematic block diagram of the detection system of the human-powered vehicle illustrated in FIG. 1.

As seen in FIG. 2, the detection system 10 comprises electronic controller circuitry EC1. The detection system 10 comprises communicator circuitry CC1. The detection system 10 includes an electric device ED. The electric device ED includes the electronic controller circuitry EC1 and the communicator circuitry CC1. Examples of the electric device ED includes a smartphone, a tablet computer, a personal computer, a wearable device, and a cycle computer. Examples of the wearable device include a watch, a bracelet, a ring, a necklace, a belt, a helmet, and a device attachable to these items. In the present embodiment, the electric device ED has a function other than a function relating to the human-powered vehicle B. The electronic controller circuitry EC1 has a function other than the function relating to the human-powered vehicle B. However, the electric device ED can have only a function relating to the human-powered vehicle B if needed or desired. The electronic controller circuitry EC1 can have only a function relating to the human-powered vehicle B if needed or desired. The electric device ED can also be referred to as an external device ED.

The electronic controller circuitry EC1 is electrically connected to the communicator circuitry CC1. The communicator circuitry CC1 is configured to wirelessly communicate with another communication device. The electronic controller circuitry EC1 is electrically connected to the communicator circuitry CC1 to control the communicator circuitry CC1.

The electronic controller circuitry EC1 includes a processor EC11 and a memory EC12. The electric device ED includes a circuit board EC13 and a system bus EC14. The communicator circuitry CC1 and the electronic controller circuitry EC1 are electrically mounted on the circuit board EC13. The electronic controller circuitry EC1 is coupled to the communicator circuitry CC1. The processor EC11 and the memory EC12 are electrically mounted on the circuit board EC13. The processor EC11 is coupled to the memory EC12. The memory EC12 is coupled to the processor EC11. The processor EC11 is electrically connected to the memory EC12 via the circuit board EC13 and the system bus EC14. The memory EC12 is electrically connected to the processor EC11 via the circuit board EC13 and the system bus EC14. For example, the electronic controller circuitry EC1 includes a semiconductor. The processor EC11 includes a semiconductor. The memory EC12 includes a semiconductor. However, the electronic controller circuitry EC1 can be free of a semiconductor if needed or desired. The processor EC11 can be free of a semiconductor if needed or desired. The memory EC12 can be free of a semiconductor if needed or desired.

For example, the processor EC11 includes at least one of a central processing unit (CPU), a micro processing unit (MPU), a graphics processing unit (GPU), and a memory controller. The memory EC12 is electrically connected to the processor EC11. For example, the memory EC12 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC12 includes storage areas each having an address. The processor EC11 is configured to control the memory EC12 to store data in the storage areas of the memory EC12 and reads data from the storage areas of the memory EC12. The processor EC11 can also be referred to as a hardware processor EC11 or a processor circuit or circuitry EC11. The memory EC12 can also be referred to as a hardware memory EC12 or a memory circuit or circuitry EC12. The memory EC12 can also be referred to as a non-transitory computer-readable storage medium EC12. Namely, the electronic controller circuitry EC1 includes the non-transitory computer-readable storage medium EC12.

The electronic controller circuitry EC1 is configured to execute at least one control algorithm of the electric device ED. For example, the electronic controller circuitry EC1 is programed to execute at least one control algorithm of the electric device ED. The memory EC12 stores at least one program including at least one program instruction. The at least one program is read into the processor EC11, and thereby the at least one control algorithm of the electric device ED is executed based on the at least one program.

The structure of the electronic controller circuitry EC1 is not limited to the above structure. The structure of the electronic controller circuitry EC1 is not limited to the processor EC11 and the memory EC12. The electronic controller circuitry EC1 can be realized by hardware alone or a combination of hardware and software. In the present embodiment, the processor EC11 and the memory EC12 are integrated as a single chip such as an application specific integrated circuit (ASIC) or a field programmable gate array (FPGA). However, the processor EC11 and the memory EC12 can be separate chips if needed or desired. The electronic controller circuitry EC1 can include the processor EC11, the memory EC12, the circuit board EC13, and the system bus EC14 if needed or desired.

The electronic controller circuitry EC1 can include at least two electronic controller circuits which are separately provided. The at least one control algorithm of the electric device ED can be executed by the at least two electronic controller circuits if needed or desired. The electronic controller circuitry EC1 can include at least two processors which are separately provided. The electronic controller circuitry EC1 can include at least two memories which are separately provided. The at least one control algorithm of the electric device ED can be executed by the at least two processors if needed or desired. The at least one control algorithm of the electric device ED can be stored in the at least two memories if needed or desired. The electronic controller circuitry EC1 can include at least two circuit boards which are separately provided if needed or desired. The electronic controller circuitry EC1 can include at least two system buses which are separately provided if needed or desired.

The communicator circuitry CC1 is electrically mounted on the circuit board EC13. The communicator circuitry CC1 is electrically connected to the processor EC11 and the memory EC12 with the circuit board EC13 and the system bus EC14.

The communicator circuitry CC1 includes wireless communicator circuitry WC1. The wireless communicator circuitry WC1 is configured to wirelessly communicate with another wireless communicator circuitry. For example, the wireless communicator circuitry WC1 includes signal transmitting circuitry WC11, signal receiving circuitry WC12, and antenna circuitry WC13. The signal transmitting circuitry WC11 is electrically connected to the antenna circuitry WC13. The signal receiving circuitry WC12 is electrically connected to the antenna circuitry WC13.

The wireless communicator circuitry WC1 is configured to transmit wireless signals via the antenna circuitry WC13. The wireless communicator circuitry WC1 is configured to superimpose digital signals on carrier wave using a predetermined wireless communication protocol to wirelessly transmit signals. In the present embodiment, the wireless communicator circuitry WC1 is configured to encrypt signals using a cryptographic key to generate encrypted wireless signals.

The wireless communicator circuitry WC1 is configured to receive wireless signals via the antenna circuitry WC13. In the present embodiment, the wireless communicator circuitry WC1 is configured to decode the wireless signals to recognize signals transmitted from other wireless communicators. The wireless communicator circuitry WC1 is configured to decrypt the wireless signals using the cryptographic key.

The wireless communicator circuitry WC1 includes a signal amplifier WC14. The signal amplifier WC14 is coupled to the signal transmitting circuitry WC11, the signal receiving circuitry WC12, and the antenna circuitry WC13. The signal amplifier WC14 is configured to selectively amplify the signals of the antenna circuitry WC13. The signal amplifier WC14 can be controlled by the electronic controller circuitry EC1. The electronic controller circuitry EC1 can be configured to control the signal amplifier WC14 such that the signal amplifier WC14 operates in a low-power or high-power consumption state.

The communicator circuitry CC1 can include wired communicator circuitry and a cable connector. The wired communicator circuitry can be electrically connected to the electronic controller circuitry EC1. The cable connector can be electrically connected to the wired communicator circuitry. The wired communicator circuitry can be configured to communicate with another wired communicator circuitry via the cable connector and an electric cable connected to the cable connector.

The wired communicator circuitry can be configured to communicate with another wired communicator circuitry using power line communication (PLC) technology. For example, the electric cable includes a ground line and a voltage line that are detachably connected to a serial bus that is formed by communication interfaces. The wired communicator circuitry can be configured to communicate with another wired communication circuitry through the voltage line using the PLC technology. Since the PLC technology has been known, it will not be described in detail here for the sake of brevity.

In the present embodiment, the electric component includes a user interface ED1 and a display ED2. The user interface ED1 is configured to receive a user input U1. The display ED2 is configured to display information relating to at least one of the electric device ED and the human-powered vehicle B. For example, the user input U1 can indicate at least one of a power-on, a power-off, a start of pairing, an end of pairing, and a change in settings.

In the present embodiment, the user interface ED1 includes a touch panel configured to receive the user input U1. The touch panel is provided in the display ED2. However, the touch panel can be omitted from the user interface ED1 if needed or desired. The user interface ED1 can include another type of interface such as a switch or a dial.

In the present embodiment, the electric device ED includes a power source holder ED3. The power source holder ED3 is configured to detachably and reattachably hold an electric power source ED4. The power source holder ED3 is configured to be electrically connected to the electronic controller circuitry EC1, the communicator circuitry CC1, and other electronic parts of the electric device ED. The electric power source ED4 is configured to supply electricity to the electronic controller circuitry EC1, the communicator circuitry CC1, and other electronic parts of the electric device ED via the power source holder ED3. Examples of the electric power source ED4 includes a primary battery and a secondary battery. The electric device ED can be configured to receive electricity from another electric power source other than the electric power source PS via an electric cable if needed or desired.

As seen in FIG. 2, the detection system 10 comprises a load sensor LS. The load sensor LS is configured to obtain load information INF1 relating to a load applied, while a rider rides the human-powered vehicle B, to the wheel FW and/or RW of the human-powered vehicle B. The electronic controller circuitry EC1 is configured to obtain, based on the load information INF1, motion information INF2 relating to a motion of the human-powered vehicle B.

The load information INF1 includes air pressure information relating to an air pressure of the wheel FW and/or RW. The load sensor LS is configured to obtain the air pressure information. The electronic controller circuitry EC1 is configured to obtain the motion information INF2 based on the air pressure information. A change in the air pressure of the wheel FW and/or RW indicates a change in the motion of the human-powered vehicle B. However, the load information INF1 can include information other than the air pressure information if needed or desired. The load sensor LS can be configured to obtain information other than the air pressure information if needed or desired. The electronic controller circuitry EC1 can be configured to obtain the motion information INF2 based on information other than the air pressure information if needed or desired.

The motion information INF2 includes a technical level of the rider. The electronic controller circuitry EC1 is configured to determine the technical level based on the load information INF1.

In the present embodiment, the technical level includes a level of a standstill technique that the rider maintains balance while the human-powered vehicle B remains stationary or moves only minimal distances. The electronic controller circuitry EC1 is configured to determine the level of the standstill technique based on the load information INF1.

Furthermore, the technical level includes a level of a neutral technique that the rider absorbs a bump of a road to reduce shocks applied to the wheel FW and/or RW while the rider rides the human-powered vehicle B. The electronic controller circuitry EC1 is configured to determine the level of the neutral technique based on the load information INF1.

The motion information INF2 include at least one of a cadence and a vehicle speed of the human-powered vehicle B. The electronic controller circuitry EC1 is configured to calculate at least one of the cadence and the vehicle speed based on the load information INF1.

The motion information INF2 can include at least one of the cadence and the vehicle speed of the human-powered vehicle B instead of or in addition to the technical level of the rider. For example, the motion information INF2 can include both the cadence and the vehicle speed of the human-powered vehicle B. The electronic controller circuitry EC1 is configured to calculate both the cadence and the vehicle speed based on the load information INF1. However, the motion information INF2 can include only one the cadence and the vehicle speed of the human-powered vehicle B if needed or desired. The electronic controller circuitry EC1 can be configured to calculate only one of the cadence and the vehicle speed based on the load information INF1 if needed or desired.

As seen in FIG. 2, the load sensor LS includes at least one of a front load sensor LS1 and a rear load sensor LS2. In the present embodiment, the load sensor LS includes the front load sensor LS1. The load sensor LS includes the rear load sensor LS2. The load information INF1 includes at least one of front load information INF11 and rear load information INF12.

The front load sensor LS1 is configured to obtain the front load information INF11 relating to a front load applied, while the rider rides the human-powered vehicle B, to the front wheel FW of the human-powered vehicle B. The rear load sensor LS2 is configured to obtain the rear load information INF12 relating to a rear load applied, while the rider rides the human-powered vehicle B, to the rear wheel RW of the human-powered vehicle B.

The front load information INF11 includes front air pressure information INF13 relating to a front air pressure of the front wheel FW. The rear load information INF12 includes rear air pressure information INF14 relating to a rear air pressure of the rear wheel RW. The rear load sensor LS2 is configured to obtain the front air pressure information INF13. The rear load sensor LS2 is configured to obtain the rear air pressure information INF14.

As seen in FIG. 1, the front load sensor LS1 is attached to the front wheel FW to detect an air pressure of the front wheel FW. The rear load sensor LS2 is attached to the rear wheel RW to detect an air pressure of the rear wheel RW. For example, the front load sensor LS1 is configured to be at least partially provided in a tube of the front wheel FW. The rear load sensor LS2 is configured to be at least partially provided in a tube of the rear wheel RW.

As seen in FIG. 2, the front load sensor LS1 includes a detector LS11. The detector LS11 is configured to detect force applied to the front load sensor LS1. The force applied to the front load sensor LS1 includes an air pressure of the front wheel FW. The detector LS11 includes a strain gauge LS11A configured to convert deformation of the strain gauge LS11A into a resistance value of the strain gauge LS11A. The strain gauge LS11A is configured to be deformable in response to the force applied to the detector LS11. The structure of the detector LS11 is not limited to the strain gauge LS11A. For example, the detector LS11 can include a piezoelectric element configured to convert deformation of the piezoelectric element into electricity.

The detector LS11 includes an output circuit LS11B. The output circuit LS11B is configured to convert the resistance value of the strain gauge LS11A into a voltage indicating the force applied to the front load sensor LS1. The output circuit LS11B is electrically connected to the strain gauge LS11A. The electronic controller circuitry is electrically connected to the detector LS11. The electronic controller circuitry is configured to generate an input signal in response to the output of the detector LS11.

As seen in FIG. 2, the front load sensor LS1 comprises electronic controller circuitry EC2. The front load sensor LS1 comprises communicator circuitry CC2. Examples of the electric device ED includes a smartphone, a tablet computer, a personal computer, a wearable device, and a cycle computer. Examples of the wearable device include a watch, a bracelet, a ring, a necklace, a belt, a helmet, a belt, and a device attachable to these items.

The electronic controller circuitry EC2 is electrically connected to the communicator circuitry CC2. The communicator circuitry CC2 is configured to communicate with another communication device such as the communicator circuitry CC1 of the electric device ED. The electronic controller circuitry EC2 is electrically connected to the communicator circuitry CC2 to control the communicator circuitry CC2.

The electronic controller circuitry EC2 includes a processor EC21 and a memory EC22. The front load sensor LS1 includes a circuit board EC23 and a system bus EC24. The communicator circuitry CC2 and the electronic controller circuitry EC2 are electrically mounted on the circuit board EC23. The electronic controller circuitry EC2 is coupled to the communicator circuitry CC2. The processor EC21 and the memory EC22 are electrically mounted on the circuit board EC23. The processor EC21 is coupled to the memory EC22. The memory EC22 is coupled to the processor EC21. The processor EC21 is electrically connected to the memory EC22 via the circuit board EC23 and the system bus EC24. The memory EC22 is electrically connected to the processor EC21 via the circuit board EC23 and the system bus EC24. For example, the electronic controller circuitry EC2 includes a semiconductor. The processor EC21 includes a semiconductor. The memory EC22 includes a semiconductor. However, the electronic controller circuitry EC2 can be free of a semiconductor if needed or desired. The processor EC21 can be free of a semiconductor if needed or desired. The memory EC22 can be free of a semiconductor if needed or desired.

For example, the processor EC21 includes at least one of a central processing unit (CPU), a micro processing unit (MPU), a graphics processing unit (GPU), and a memory controller. The memory EC22 is electrically connected to the processor EC21. For example, the memory EC22 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC22 includes storage areas each having an address. The processor EC21 is configured to control the memory EC22 to store data in the storage areas of the memory EC22 and reads data from the storage areas of the memory EC22. The processor EC21 can also be referred to as a hardware processor EC21 or a processor circuit or circuitry EC21. The memory EC22 can also be referred to as a hardware memory EC22 or a memory circuit or circuitry EC22. The memory EC22 can also be referred to as a non-transitory computer-readable storage medium EC22. Namely, the electronic controller circuitry EC2 includes the non-transitory computer-readable storage medium EC22.

The electronic controller circuitry EC2 is configured to execute at least one control algorithm of the front load sensor LS1. For example, the electronic controller circuitry EC2 is programed to execute at least one control algorithm of the front load sensor LS1. The memory EC22 stores at least one program including at least one program instruction. The at least one program is read into the processor EC21, and thereby the at least one control algorithm of the front load sensor LS1 is executed based on the at least one program.

The structure of the electronic controller circuitry EC2 is not limited to the above structure. The structure of the electronic controller circuitry EC2 is not limited to the processor EC21 and the memory EC22. The electronic controller circuitry EC2 can be realized by hardware alone or a combination of hardware and software. In the present embodiment, the processor EC21 and the memory EC22 are integrated as a single chip such as an application specific integrated circuit (ASIC) or a field programmable gate array (FPGA). However, the processor EC21 and the memory EC22 can be separate chips if needed or desired. The electronic controller circuitry EC2 can include the processor EC21, the memory EC22, the circuit board EC23, and the system bus EC24 if needed or desired.

The electronic controller circuitry EC2 can include at least two electronic controller circuits which are separately provided. The at least one control algorithm of the front load sensor LS1 can be executed by the at least two electronic controller circuits if needed or desired. The electronic controller circuitry EC2 can include at least two processors which are separately provided. The electronic controller circuitry EC2 can include at least two memories which are separately provided. The at least one control algorithm of the front load sensor LS1 can be executed by the at least two processors if needed or desired. The at least one control algorithm of the front load sensor LS1 can be stored in the at least two memories if needed or desired. The electronic controller circuitry EC2 can include at least two circuit boards which are separately provided if needed or desired. The electronic controller circuitry EC2 can include at least two system buses which are separately provided if needed or desired.

The communicator circuitry CC2 is electrically mounted on the circuit board EC23. The communicator circuitry CC2 is electrically connected to the processor EC21 and the memory EC22 with the circuit board EC23 and the system bus EC24.

The communicator circuitry CC2 includes wireless communicator circuitry WC2. The wireless communicator circuitry WC2 is configured to wirelessly communicate with another wireless communicator circuitry such as the wireless communicator circuitry WC1 of the electric device ED. For example, the wireless communicator circuitry WC2 includes signal transmitting circuitry WC21, signal receiving circuitry WC22, and antenna circuitry WC23. The signal transmitting circuitry WC21 is electrically connected to the antenna circuitry WC23. The signal receiving circuitry WC22 is electrically connected to the antenna circuitry WC23.

The wireless communicator circuitry WC2 is configured to transmit wireless signals via the antenna circuitry WC23. The wireless communicator circuitry WC2 is configured to superimpose digital signals on carrier wave using a predetermined wireless communication protocol to wirelessly transmit signals. In the present embodiment, the wireless communicator circuitry WC2 is configured to encrypt signals using a cryptographic key to generate encrypted wireless signals.

The wireless communicator circuitry WC2 is configured to receive wireless signals via the antenna circuitry WC23. In the present embodiment, the wireless communicator circuitry WC2 is configured to decode the wireless signals to recognize signals transmitted from other wireless communicators. The wireless communicator circuitry WC2 is configured to decrypt the wireless signals using the cryptographic key.

The wireless communicator circuitry WC2 includes a signal amplifier WC24. The signal amplifier WC24 is coupled to the signal transmitting circuitry WC21, the signal receiving circuitry WC22, and the antenna circuitry WC23. The signal amplifier WC24 is configured to selectively amplify the signals of the antenna circuitry WC23. The signal amplifier WC24 can be controlled by the electronic controller circuitry EC2. The electronic controller circuitry EC2 can be configured to control the signal amplifier WC24 such that the signal amplifier WC24 operates in a low-power or high-power consumption state.

The communicator circuitry CC2 can include wired communicator circuitry and a cable connector. The wired communicator circuitry can be electrically connected to the electronic controller circuitry EC2. The cable connector can be electrically connected to the wired communicator circuitry. The wired communicator circuitry can be configured to communicate with another wired communicator circuitry via the cable connector and an electric cable connected to the cable connector.

The wired communicator circuitry can be configured to communicate with another wired communicator circuitry using power line communication (PLC) technology. For example, the electric cable includes a ground line and a voltage line that are detachably connected to a serial bus that is formed by communication interfaces. The wired communicator circuitry can be configured to communicate with another wired communication circuitry through the voltage line using the PLC technology. Since the PLC technology has been known, it will not be described in detail here for the sake of brevity.

In the present embodiment, the electric component includes a user interface LS15 and an indicator LS16. The user interface LS15 is configured to receive a user input U2. The indicator LS16 is configured to indicate information relating to at least one of the front load sensor LS1 and the human-powered vehicle B. For example, the user input U2 can indicate at least one of a power-on, a power-off, a start of pairing, an end of pairing, and a change in settings. The user interface LS15 includes a switch configured to receive the user input U2. The user interface LS15 can include another type of interface such as a touch panel or a dial.

In the present embodiment, the electric device ED includes a power source holder LS13. The power source holder LS13 is configured to detachably and reattachably hold an electric power source LS14. The power source holder LS13 is configured to be electrically connected to the electronic controller circuitry EC2, the communicator circuitry CC2, and other electronic parts of the electric device ED. The electric power source LS14 is configured to supply electricity to the electronic controller circuitry EC2, the communicator circuitry CC2, and other electronic parts of the electric device ED via the power source holder LS13. Examples of the electric power source LS14 includes a primary battery and a secondary battery.

As seen in FIG. 2, the rear load sensor LS2 includes a detector LS21. The detector LS21 is configured to detect force applied to the rear load sensor LS2. The force applied to the rear load sensor LS2 includes an air pressure of the rear wheel RW. The detector LS21 includes a strain gauge LS21A configured to convert deformation of the strain gauge LS21A into a resistance value of the strain gauge LS21A. The strain gauge LS21A is configured to be deformable in response to the force applied to the detector LS21. The structure of the detector LS21 is not limited to the strain gauge LS21A. For example, the detector LS21 can include a piezoelectric element configured to convert deformation of the piezoelectric element into electricity.

The detector LS21 includes an output circuit LS21B. The output circuit LS21B is configured to convert the resistance value of the strain gauge LS21A into a voltage indicating the force applied to the rear load sensor LS2. The output circuit LS21B is electrically connected to the strain gauge LS21A. The electronic controller circuitry is electrically connected to the detector LS21. The electronic controller circuitry is configured to generate an input signal in response to the output of the detector LS21.

As seen in FIG. 2, the rear load sensor LS2 comprises electronic controller circuitry EC3. The rear load sensor LS2 comprises communicator circuitry CC3. Examples of the electric device ED includes a smartphone, a tablet computer, a personal computer, a wearable device, and a cycle computer. Examples of the wearable device include a watch, a bracelet, a ring, a necklace, a belt, a helmet, a belt, and a device attachable to these items.

The electronic controller circuitry EC3 is electrically connected to the communicator circuitry CC3. The communicator circuitry CC3 is configured to communicate with another communication device such as the communicator circuitry CC1 of the electric device ED and the communicator circuitry CC2 of the front load sensor LS1. The electronic controller circuitry EC3 is electrically connected to the communicator circuitry CC3 to control the communicator circuitry CC3.

The electronic controller circuitry EC3 includes a processor EC31 and a memory EC32. The rear load sensor LS2 includes a circuit board EC33 and a system bus EC34. The communicator circuitry CC3 and the electronic controller circuitry EC3 are electrically mounted on the circuit board EC33. The electronic controller circuitry EC3 is coupled to the communicator circuitry CC3. The processor EC31 and the memory EC32 are electrically mounted on the circuit board EC33. The processor EC31 is coupled to the memory EC32. The memory EC32 is coupled to the processor EC31. The processor EC31 is electrically connected to the memory EC32 via the circuit board EC33 and the system bus EC34. The memory EC32 is electrically connected to the processor EC31 via the circuit board EC33 and the system bus EC34. For example, the electronic controller circuitry EC3 includes a semiconductor. The processor EC31 includes a semiconductor. The memory EC32 includes a semiconductor. However, the electronic controller circuitry EC3 can be free of a semiconductor if needed or desired. The processor EC31 can be free of a semiconductor if needed or desired. The memory EC32 can be free of a semiconductor if needed or desired.

For example, the processor EC31 includes at least one of a central processing unit (CPU), a micro processing unit (MPU), a graphics processing unit (GPU), and a memory controller. The memory EC32 is electrically connected to the processor EC31. For example, the memory EC32 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC32 includes storage areas each having an address. The processor EC31 is configured to control the memory EC32 to store data in the storage areas of the memory EC32 and reads data from the storage areas of the memory EC32. The processor EC31 can also be referred to as a hardware processor EC31 or a processor circuit or circuitry EC31. The memory EC32 can also be referred to as a hardware memory EC32 or a memory circuit or circuitry EC32. The memory EC32 can also be referred to as a non-transitory computer-readable storage medium EC32. Namely, the electronic controller circuitry EC3 includes the non-transitory computer-readable storage medium EC32.

The electronic controller circuitry EC3 is configured to execute at least one control algorithm of the rear load sensor LS2. For example, the electronic controller circuitry EC3 is programed to execute at least one control algorithm of the rear load sensor LS2. The memory EC32 stores at least one program including at least one program instruction. The at least one program is read into the processor EC31, and thereby the at least one control algorithm of the rear load sensor LS2 is executed based on the at least one program.

The structure of the electronic controller circuitry EC3 is not limited to the above structure. The structure of the electronic controller circuitry EC3 is not limited to the processor EC31 and the memory EC32. The electronic controller circuitry EC3 can be realized by hardware alone or a combination of hardware and software. In the present embodiment, the processor EC31 and the memory EC32 are integrated as a single chip such as an application specific integrated circuit (ASIC) or a field programmable gate array (FPGA). However, the processor EC31 and the memory EC32 can be separate chips if needed or desired. The electronic controller circuitry EC3 can include the processor EC31, the memory EC32, the circuit board EC33, and the system bus EC34 if needed or desired.

The electronic controller circuitry EC3 can include at least two electronic controller circuits which are separately provided. The at least one control algorithm of the rear load sensor LS2 can be executed by the at least two electronic controller circuits if needed or desired. The electronic controller circuitry EC3 can include at least two processors which are separately provided. The electronic controller circuitry EC3 can include at least two memories which are separately provided. The at least one control algorithm of the rear load sensor LS2 can be executed by the at least two processors if needed or desired. The at least one control algorithm of the rear load sensor LS2 can be stored in the at least two memories if needed or desired. The electronic controller circuitry EC3 can include at least two circuit boards which are separately provided if needed or desired. The electronic controller circuitry EC3 can include at least two system buses which are separately provided if needed or desired.

The communicator circuitry CC3 is electrically mounted on the circuit board EC33. The communicator circuitry CC3 is electrically connected to the processor EC31 and the memory EC32 with the circuit board EC33 and the system bus EC34.

The communicator circuitry CC3 includes wireless communicator circuitry WC3. The wireless communicator circuitry WC3 is configured to wirelessly communicate with another wireless communicator circuitry. For example, the wireless communicator circuitry WC3 includes signal transmitting circuitry WC31, signal receiving circuitry WC32, and antenna circuitry WC33. The signal transmitting circuitry WC31 is electrically connected to the antenna circuitry WC33. The signal receiving circuitry WC32 is electrically connected to the antenna circuitry WC33.

The wireless communicator circuitry WC3 is configured to transmit wireless signals via the antenna circuitry WC33. The wireless communicator circuitry WC3 is configured to superimpose digital signals on carrier wave using a predetermined wireless communication protocol to wirelessly transmit signals. In the present embodiment, the wireless communicator circuitry WC3 is configured to encrypt signals using a cryptographic key to generate encrypted wireless signals.

The wireless communicator circuitry WC3 is configured to receive wireless signals via the antenna circuitry WC33. In the present embodiment, the wireless communicator circuitry WC3 is configured to decode the wireless signals to recognize signals transmitted from other wireless communicators. The wireless communicator circuitry WC3 is configured to decrypt the wireless signals using the cryptographic key.

The wireless communicator circuitry WC3 includes a signal amplifier WC34. The signal amplifier WC34 is coupled to the signal transmitting circuitry WC31, the signal receiving circuitry WC32, and the antenna circuitry WC33. The signal amplifier WC34 is configured to selectively amplify the signals of the antenna circuitry WC33. The signal amplifier WC34 can be controlled by the electronic controller circuitry EC3. The electronic controller circuitry EC3 can be configured to control the signal amplifier WC34 such that the signal amplifier WC34 operates in a low-power or high-power consumption state.

The communicator circuitry CC3 can include wired communicator circuitry and a cable connector. The wired communicator circuitry can be electrically connected to the electronic controller circuitry EC3. The cable connector can be electrically connected to the wired communicator circuitry. The wired communicator circuitry can be configured to communicate with another wired communicator circuitry via the cable connector and an electric cable connected to the cable connector.

The wired communicator circuitry can be configured to communicate with another wired communicator circuitry using power line communication (PLC) technology. For example, the electric cable includes a ground line and a voltage line that are detachably connected to a serial bus that is formed by communication interfaces. The wired communicator circuitry can be configured to communicate with another wired communication circuitry through the voltage line using the PLC technology. Since the PLC technology has been known, it will not be described in detail here for the sake of brevity.

In the present embodiment, the electric component includes a user interface LS25 and an indicator LS26. The user interface LS25 is configured to receive a user input U2. The indicator LS26 is configured to indicate information relating to at least one of the rear load sensor LS2 and the human-powered vehicle B. For example, the user input U2 can indicate at least one of a power-on, a power-off, a start of pairing, an end of pairing, and a change in settings. The user interface LS25 includes a switch configured to receive the user input U2. The user interface LS25 can include another type of interface such as a touch panel or a dial.

In the present embodiment, the electric device ED includes a power source holder LS23. The power source holder LS23 is configured to detachably and reattachably hold an electric power source LS24. The power source holder LS23 is configured to be electrically connected to the electronic controller circuitry EC3, the communicator circuitry CC3, and other electronic parts of the electric device ED. The electric power source LS24 is configured to supply electricity to the electronic controller circuitry EC3, the communicator circuitry CC3, and other electronic parts of the electric device ED via the power source holder LS23. Examples of the electric power source LS24 includes a primary battery and a secondary battery.

As seen in FIG. 2, the load sensor LS is configured to obtain the load information INF1 at regular intervals. The load sensor LS is configured to wirelessly transmit the load information INF1 to the electric device ED at intervals. For example, the front load sensor LS1 is configured to wirelessly obtain the front load information INF11 at intervals. The front load sensor LS1 is configured to wirelessly transmit the front load information INF11 to the electric device ED at intervals via the wireless communicator circuitry WC2. The rear load sensor LS2 is configured to obtain the rear load information INF12 at intervals. The rear load sensor LS2 is configured to wirelessly transmit the rear load information INF12 to the electric device ED at intervals via the wireless communicator circuitry WC3.

The electric device ED is configured to wirelessly receive the load information INF1 from the load sensor LS at intervals. For example, the electric device ED is configured to wirelessly receive the front load information INF11 from the front load sensor LS1 via the wireless communicator circuitry WC1 at intervals. The electric device ED is configured to wirelessly receive the front air pressure information INF13 from the front load sensor LS1 via the wireless communicator circuitry WC1 at intervals. The electric device ED is configured to wirelessly receive the rear load information INF12 from the rear load sensor LS2 via the wireless communicator circuitry WC1 at intervals. The electric device ED is configured to wirelessly receive the rear air pressure information INF14 from the rear load sensor LS2 via the wireless communicator circuitry WC1 at intervals.

The electronic controller circuitry EC1 is configured to store the load information INF1 received at intervals in the memory EC12. The electronic controller circuitry EC1 is configured to store the front load information INF11 received at intervals in the memory EC12. The electronic controller circuitry EC1 is configured to store the front air pressure information INF13 received at intervals in the memory EC12. The electronic controller circuitry EC1 is configured to store the rear load information INF12 received at intervals in the memory EC12. The electronic controller circuitry EC1 is configured to store the rear air pressure information INF14 received at intervals in the memory EC12.

The electronic controller circuitry EC1 is configured to calculate a load difference between the front load information INF11 and the rear load information INF12 at intervals. The electronic controller circuitry EC1 is configured to subtract the rear load information INF12 from the front load information INF11 at intervals to calculate the load difference. For example, the electronic controller circuitry EC1 is configured to subtract the rear air pressure information INF14 from the front air pressure information INF13 at intervals to calculate the load difference. In a case where the front air pressure information INF13 and the rear air pressure information INF14 indicate the air pressure of the front wheel FW and the air pressure of the rear wheel RW, the electronic controller circuitry EC1 is configured to subtract the air pressure of the wheel RW from the air pressure of the wheel FW at intervals to calculate the load difference. Thus, the difference between the air pressure of the front wheel FW and the air pressure of the rear wheel RW indicates where the center of the gravity of the human-powered vehicle B and the rider is located in a neutral position, on a front side relative to the neutral position, or on a rear side relative to the neutral position.

The electronic controller circuitry EC1 is configured to store the load difference in the memory EC12 at intervals.

The electronic controller circuitry EC1 is configured to store, in the memory EC12, at least two load differences calculated by the electronic controller circuitry EC1 at intervals. The electronic controller circuitry EC1 is configured to store the total number of the at least two load differences stored in the memory EC12.

The electronic controller circuitry EC1 is configured to calculate standard deviation of the load difference. The electronic controller circuitry EC1 is configured to calculate standard deviation of the load difference at intervals. For example, the electronic controller circuitry EC1 is configured to calculate an average of the at least two load differences at intervals based on the at least two load differences and the total number of the at least two load differences. The electronic controller circuitry EC1 is configured to calculate the standard deviation based on the average of the at least two load differences and each of the at least two load differences. The electronic controller circuitry EC1 is configured to calculate the standard deviation based on the average of the at least two load differences and each of the at least two load differences. The electronic controller circuitry EC1 is configured to store the standard deviation in the memory EC12.

As seen in FIG. 2, the electronic controller circuitry EC1 is configured to determine the technical level based on at least one of the front load information INF11 and the rear load information INF12. The electronic controller circuitry EC1 is configured to determine the technical level based on at least one of the front air pressure information INF13 and the rear air pressure information INF14. The electronic controller circuitry EC1 is configured to determine the technical level based on both the front load information INF11 and the rear load information INF12. The electronic controller circuitry EC1 is configured to determine the technical level based on both the front air pressure information INF13 and the rear air pressure information INF14.

The electronic controller circuitry EC1 is configured to determine the technical level based on the load difference between the front load information INF11 and the rear load information INF12. The electronic controller circuitry EC1 is configured to determine the technical level based on a change in the load difference. The electronic controller circuitry EC1 is configured to determine the technical level based on the standard deviation. The electronic controller circuitry EC1 is configured to determine the technical level based on the standard deviation stored in the memory EC12. For example, the electronic controller circuitry EC1 is configured to determine the level of the standstill technique based on the standard deviation.

The electronic controller circuitry EC1 is configured to determine the technical level based on a change in the load information INF1. The electronic controller circuitry EC1 is configured to determine the technical level based on at least one of a change in the front load information INF11 and a change in the rear load information INF12. The electronic controller circuitry EC1 is configured to determine the technical level based on at least one of a change in the front air pressure information INF13 and a change in the rear air pressure information INF14. The electronic controller circuitry EC1 is configured to determine the technical level based on both the change in the front load information INF11 and the change in the rear load information INF12. The electronic controller circuitry EC1 is configured to determine the technical level based on both the change in the front air pressure information INF13 and the change in the rear air pressure information INF14. For example, the electronic controller circuitry EC1 is configured to determine the level of the neutral technique based on both the change in the front air pressure information INF13 and the change in the rear air pressure information INF14.

The technical level includes a first technical level and a second technical level. The first technical level includes a first level of the standstill technique. The second technical level includes a second level of the standstill technique. Furthermore, the first technical level includes a first level of the neutral technique. The second technical level includes a second level of the neutral technique. The technical level can include at least one additional technical level in addition to the first and second technical levels if needed or desired. The technical level can include the first level of the standstill technique and the second level of the standstill technique if needed or desired. The technical level can include the first level of the neutral technique and the second level of the neutral technique if needed or desired.

In a case where the technical level include the level of the standstill technique, the electronic controller circuitry EC1 uses a first level threshold. The electronic controller circuitry EC1 is configured to select the first technical level in a case where the standard deviation is less than the first level threshold. The electronic controller circuitry EC1 is configured to select the second technical level in a case where the standard deviation is greater than the first level threshold. The electronic controller circuitry EC1 is configured to select the second technical level in a case where the standard deviation is greater than or equal to the first level threshold. The electronic controller circuitry EC1 can be configured to select the first technical level in a case where the standard deviation is equal to the first level threshold.

In a case where the technical level include the level of the neutral technique, the electronic controller circuitry EC1 uses a second level threshold, the electronic controller circuitry EC1 is configured to select the first technical level in a case where the change in the load information INF1 is less than the second level threshold. The electronic controller circuitry EC1 is configured to select the second technical level in a case where the change in the load information INF1 is greater than the second level threshold. The second level threshold includes a front level threshold and a rear level threshold.

The electronic controller circuitry EC1 is configured to select the first technical level in a case where the change in the front load information INF11 is less than the front level threshold and where the change in the rear load information INF12 is less than the rear level threshold. For example, the electronic controller circuitry EC1 is configured to select the first technical level in a case where the change in the front air pressure information INF13 is less than the front level threshold and where the change in the rear air pressure information INF14 is less than the rear level threshold.

The electronic controller circuitry EC1 is configured to select the second technical level in a case where the change in the front load information INF11 is greater than or equal to the front level threshold and where the change in the rear load information INF12 is greater than or equal to the rear level threshold. For example, the electronic controller circuitry EC1 is configured to select the second technical level in a case where the change in the front air pressure information INF13 is greater than the front level threshold and where the change in the rear air pressure information INF14 is greater than the rear level threshold.

The electronic controller circuitry EC1 can be configured to select the first technical level in a case where the change in the front load information INF11 is equal to the front level threshold and where the change in the rear load information INF12 is equal to the rear level threshold. The electronic controller circuitry EC1 can be configured to select the first technical level in a case where the change in the front air pressure information INF13 is equal to the front level threshold and where the change in the rear air pressure information INF14 is equal to the rear level threshold.

The electronic controller circuitry EC1 is configured to calculate at least one of the cadence and the vehicle speed based on the rear load information INF12. The electronic controller circuitry EC1 is configured to calculate at least one of the cadence and the vehicle speed based on the rear air pressure information INF14. For example, the electronic controller circuitry EC1 is configured to calculate both the cadence and the vehicle speed based on the rear load information INF12. The electronic controller circuitry EC1 is configured to calculate both the cadence and the vehicle speed based on the rear air pressure information INF14. However, the electronic controller circuitry EC1 can be configured to calculate only one of the cadence and the vehicle speed based on the rear load information INF12 if needed or desired. The electronic controller circuitry EC1 can be configured to calculate only one of the cadence and the vehicle speed based on the rear air pressure information INF14.

The electronic controller circuitry EC1 is configured to calculate at least one of the cadence and the vehicle speed based on a change in the load information INF1. The electronic controller circuitry EC1 is configured to calculate at least one of the cadence and the vehicle speed based on a change in the rear load information INF12. The electronic controller circuitry EC1 is configured to calculate at least one of the cadence and the vehicle speed based on a change in the rear air pressure information INF14.

For example, the electronic controller circuitry EC1 is configured to calculate both the cadence and the vehicle speed based on the change in the load information INF1. The electronic controller circuitry EC1 is configured to calculate both the cadence and the vehicle speed based on the change in the rear load information INF12. The electronic controller circuitry EC1 is configured to calculate both the cadence and the vehicle speed based on the change in the rear air pressure information INF14. However, the electronic controller circuitry EC1 can be configured to calculate only one the cadence and the vehicle speed based on the change in the load information INF1 if needed or desired. The electronic controller circuitry EC1 can be configured to calculate only one the cadence and the vehicle speed based on the change in the rear load information INF12 if needed or desired. The electronic controller circuitry EC1 can be configured to calculate only one the cadence and the vehicle speed based on the change in the rear air pressure information INF14 if needed or desired.

The electronic controller circuitry EC1 is configured to calculate at least one of the cadence and the vehicle speed based on a total number of peaks of the load information INF1 per unit time. The electronic controller circuitry EC1 is configured to calculate at least one of the cadence and the vehicle speed based on a total number of peaks of the rear load information INF12 per unit time. The electronic controller circuitry EC1 is configured to calculate at least one of the cadence and the vehicle speed based on a total number of peaks of the rear air pressure information INF14 per unit time.

Figure 3:
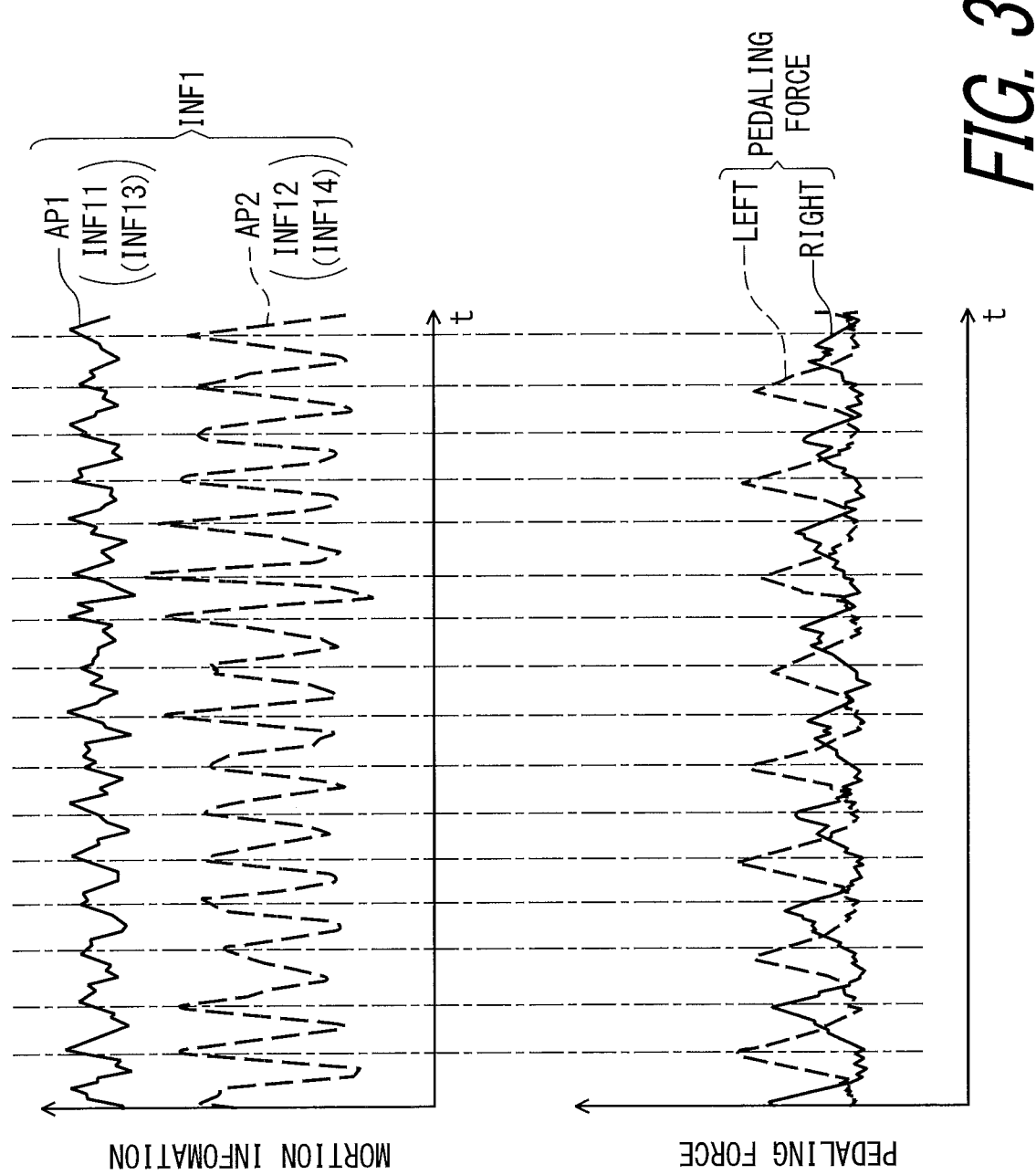
FIG. 3 shows graphs of motion information and pedaling torque of the human-powered vehicle illustrated in FIG. 1.

As seen in FIG. 3, the air pressure AP2 of the rear wheel RW reaches a peak when pedaling torque applied to the crank CR reaches a peak. For example, the air pressure AP2 of the rear wheel RW reaches a peak when pedaling torque applied to a right arm of the crank CR reaches a peak. The air pressure AP2 of the rear wheel RW reaches another peak when pedaling torque applied to a left arm of the crank CR reaches a peak. Thus, the electronic controller circuitry EC1 is configured to calculate, as the cadence, a half of the total number of peaks of the rear load information INF12.

As seen in FIG. 2, the electronic controller circuitry EC1 is configured to calculate the vehicle speed V based on the cadence C, a current gear ratio G, and a circumferential length L of the wheel RW, and the following equation (1). The equation (1) includes the cadence C calculated based on the load information INF1. Thus, the electronic controller circuitry EC1 is configured to calculate the vehicle speed V based on the load information INF1.

$$V = C \times G \times L \qquad (1)$$

The electronic controller circuitry EC1 is configured to obtain the current gear ratio G from the gear changer 12 and store the current gear ratio G in the memory EC12. For example, the gear changer 12 includes additional wireless communicator circuitry configured to wirelessly communicate with another wireless communicator circuitry, and the electronic controller circuitry EC1 wirelessly receives the current gear ratio G from the gear changer 12 at intervals via the wireless communicator circuitry WC1 and the additional wireless communicator circuitry of the gear changer 12. The electronic controller circuitry EC1 is configured to store the circumferential length L in the memory EC12.

The detection method executed by the detection system 10 will be described in detail below referring to FIGS. 4 to 7. As seen in FIGS. 4 to 7, the detection method comprises: obtaining the load information INF1 relating to the load applied, while the rider rides the human-powered vehicle B, to the wheel FW and/or RW of the human-powered vehicle B; and obtaining, based on the load information INF1, the motion information INF2 relating to the motion of the human-powered vehicle B. The computer-readable storage medium EC12 stores program instructions for causing the electronic controller circuitry EC1 to execute the detection method.

Figure 4:
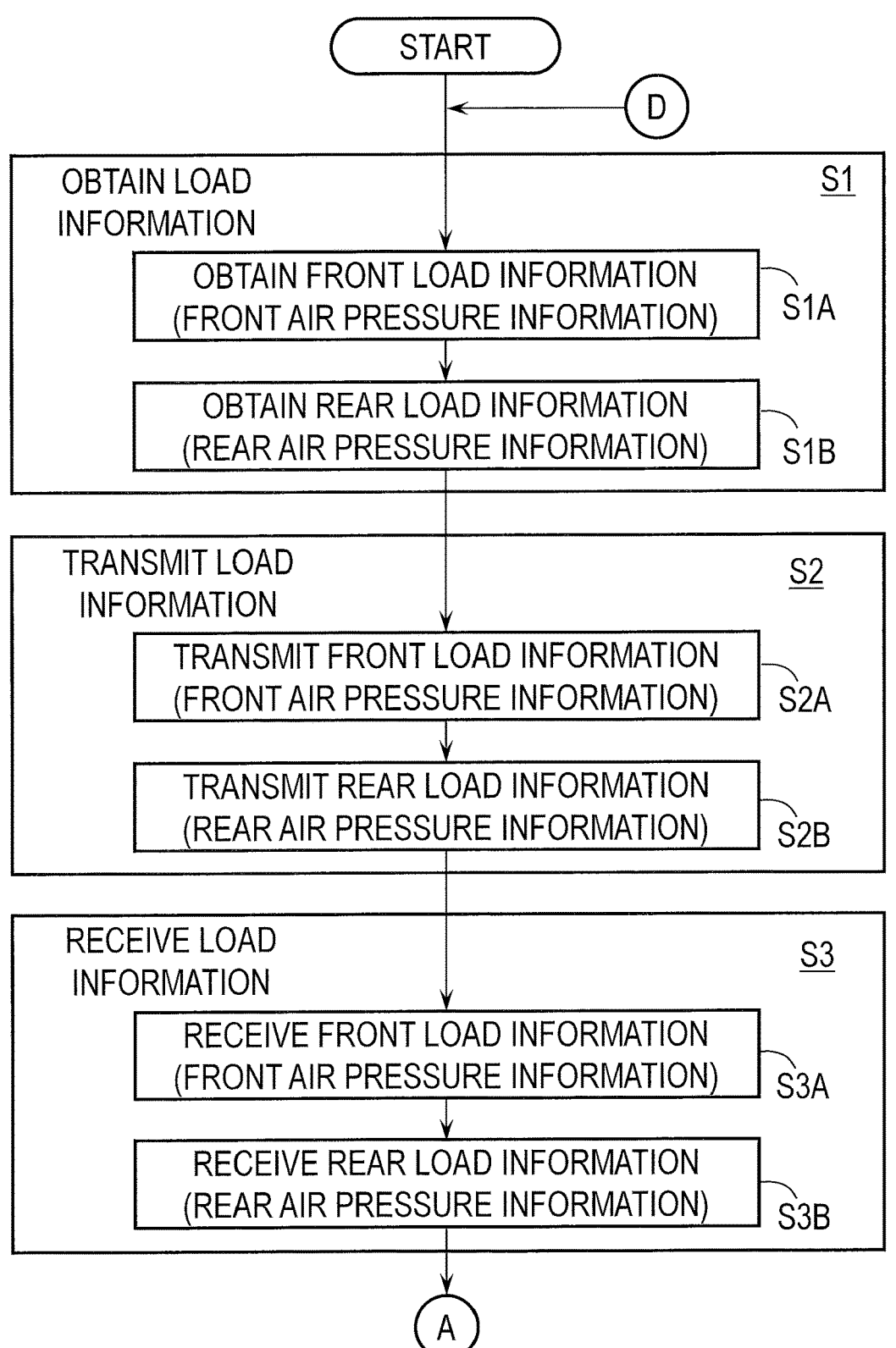
FIGS. 4 to 7 show a flowchart of the detection system of the human-powered vehicle illustrated in FIG. 1.

As seen in FIG. 4, in step S1, the load information INF1 is obtained by the load sensor LS. In step S1A, the front load information INF11 is obtained by the front load sensor LS1. In step S1A, for example, the front air pressure information INF13 is obtained by the front load sensor LS1. In step S1B, the rear load information INF12 is obtained by the rear load sensor LS2. In step S1B, for example, the rear air pressure information INF14 is obtained by the rear load sensor LS2.

In step S2, the load information INF1 is wirelessly transmitted from the load sensor LS to the electronic controller circuitry EC1 of the electric device ED. In step S2A, the front load information INF11 is wirelessly transmitted from the front load sensor LS1 to the electronic controller circuitry EC1 of the electric device ED. In step S2A, for example, the front air pressure information INF13 is wirelessly transmitted from the front load sensor LS1 to the electronic controller circuitry EC1 of the electric device ED. In step S2B, the rear load information INF12 is wirelessly transmitted from the rear load sensor LS2 to the electronic controller circuitry EC1 of the electric device ED. In step S2B, for example, the rear air pressure information INF14 is wirelessly transmitted from the rear load sensor LS2 to the electronic controller circuitry EC1 of the electric device ED.

In step S3, the load information INF1 is received by the electronic controller circuitry EC1 of the electric device ED from the load sensor LS.

In step S3A, the front load information INF11 is received by the electronic controller circuitry EC1 of the electric device ED from the front load sensor LS1. The front load information INF11 is stored in the memory EC12 by the electronic controller circuitry EC1. In step S3A, for example, the front air pressure information INF13 is received by the electronic controller circuitry EC1 of the electric device ED from the front load sensor LS1. The front air pressure information INF13 is stored in the memory EC12 by the electronic controller circuitry EC1.

In step S3B, the rear load information INF12 is received by the electronic controller circuitry EC1 of the electric device ED from the rear load sensor LS2. The rear load information INF12 is stored in the memory EC12 by the electronic controller circuitry EC1. In step S3B, for example, the rear air pressure information INF14 is received by the electronic controller circuitry EC1 of the electric device ED from the rear load sensor LS2. The rear air pressure information INF14 is stored in the memory EC12 by the electronic controller circuitry EC1.

Figure 5:
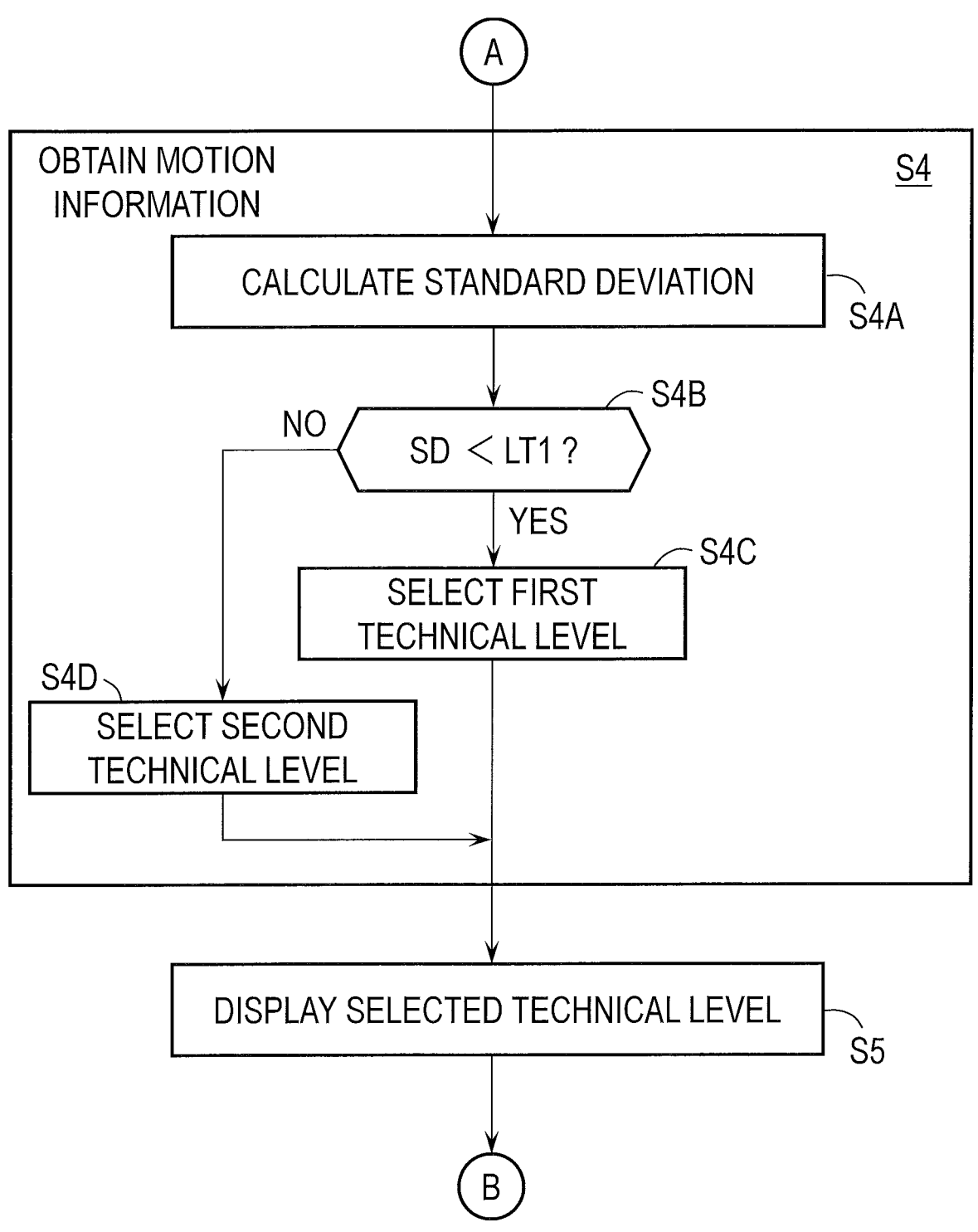

As seen in FIG. 5, in step S4, the motion information INF2 is obtained by the electronic controller circuitry EC1 based on the load information INF1. In step S4, the level of the standstill technique is determined by the electronic controller circuitry EC1.

In step S4A, the standard deviation of the load difference between the front load information INF11 and the rear load information INF12 is calculated by the electronic controller circuitry EC1 based on the front load information INF11 and the rear load information INF12. In step S4A, for example, the standard deviation of the load difference between the front air pressure information INF13 and the rear air pressure information INF14 is calculated by the electronic controller circuitry EC1 based on the front air pressure information INF13 and the rear air pressure information INF14.

In step S4A, for example, the average of the at least two load differences is calculated by the electronic controller circuitry EC1. The at least two load differences are stored in the memory EC12. In step S4A, the standard deviation of the at least two load differences is calculated by the electronic controller circuitry EC1 based on the average of the at least two load differences and each of the at least two load differences.

In step S4B, the standard deviation SD is compared with the first level threshold LT1 by the electronic controller circuitry EC1. In steps S4B and S4C, in a case where the standard deviation SD is less than the first level threshold LT1, the first technical level LV11 is selected as the technical level by the electronic controller circuitry EC1. In steps S4B and S4D, in a case where the standard deviation SD is greater than or equal to the first level threshold LT1, the second technical level LV12 is selected as the technical level by the electronic controller circuitry EC1.

In step S5, the selected technical level is displayed by the display ED2. The first technical level LV11 is displayed by the display ED2 in a case where the first technical level LV11 has been selected by the electronic controller circuitry EC1. The second technical level LV12 is displayed by the display ED2 in a case where the second technical level LV12 has been selected by the electronic controller circuitry EC1. Thus, the user can recognize the technical level of the user based on the selected technical level.

Figure 6:
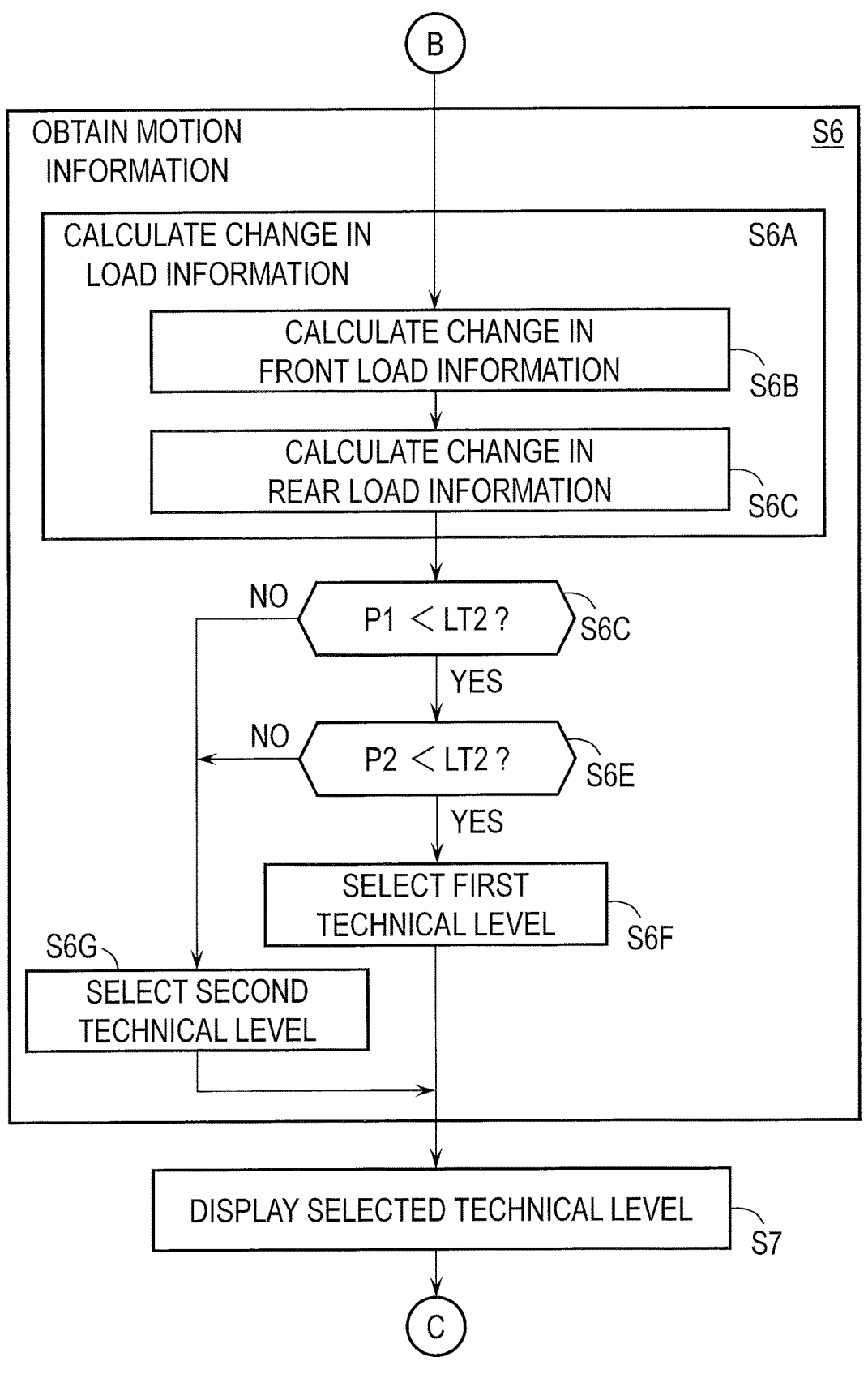

As seen in FIG. 6, in step S6, the motion information INF2 is obtained by the electronic controller circuitry EC1 based on the load information INF1. In step S6, the level of the neutral technique is determined by the electronic controller circuitry EC1.

In step S6A, the change in the load information INF1 is calculated by the electronic controller circuitry EC1 based on the previous value and the current value of the load information INF1. In step S6B, the change in the front load information INF11 is calculated by the electronic controller circuitry EC1 based on the previous value and the current value of the front load information INF11. In step S6B, for example, the change in the front air pressure information INF13 is calculated by the electronic controller circuitry EC1 based on the previous value and the current value of the front air pressure information INF13. In step S6C, the change in the rear load information INF12 is calculated by the electronic controller circuitry EC1 based on the previous value and the current value of the rear load information INF12. In step S6C, for example, the change in the rear air pressure information INF14 is calculated by the electronic controller circuitry EC1 based on the previous value and the current value of the rear air pressure information INF14.

In step S6D, the change P1 in the front load information INF11 is compared with the second level threshold LT2 by the electronic controller circuitry EC1. In step S6D, for example, the change P1 in the front air pressure information INF13 is compared with the second level threshold LT2 by the electronic controller circuitry EC1.

In steps S6D and S6E, in a case where the change P1 in the front load information INF11 is less than the second level threshold LT2, the change P2 in the rear load information INF12 is compared with the second level threshold LT2 by the electronic controller circuitry EC1. In step S6E, for example, the change P2 in the rear air pressure information INF14 is compared with the second level threshold LT2 by the electronic controller circuitry EC1.

In steps S6E and S6F, in a case where the change P2 in the rear load information INF12 is less than the second level threshold LT2, the first technical level LV21 is selected as the technical level by the electronic controller circuitry EC1. In steps S6E and S6F, for example, in a case where the change P2 in the rear air pressure information INF14 is less than the second level threshold LT2, the first technical level LV21 is selected as the technical level by the electronic controller circuitry EC1.

In steps S6D, S6E, and S6G, in a case where at least one of the change P1 in the front load information INF11 and the change P2 in the rear load information INF12 is greater than or equal to the second level threshold LT2, the second technical level LV22 is selected as the technical level by the electronic controller circuitry EC1. In steps S6D, S6E, and S6G, for example, in a case where at least one of the change P1 in the front air pressure information INF13 and the change P2 in the rear air pressure information INF14 is greater than or equal to the second level threshold LT2, the second technical level LV22 is selected as the technical level by the electronic controller circuitry EC1.

In step S7, the selected technical level is displayed by the display ED2. The first technical level LV21 is displayed by the display ED2 in a case where the first technical level LV21 has been selected by the electronic controller circuitry EC1. The second technical level LV22 is displayed by the display ED2 in a case where the second technical level LV22 has been selected by the electronic controller circuitry EC1. Thus, the user can recognize the technical level of the user based on the selected technical level.

Figure 7:
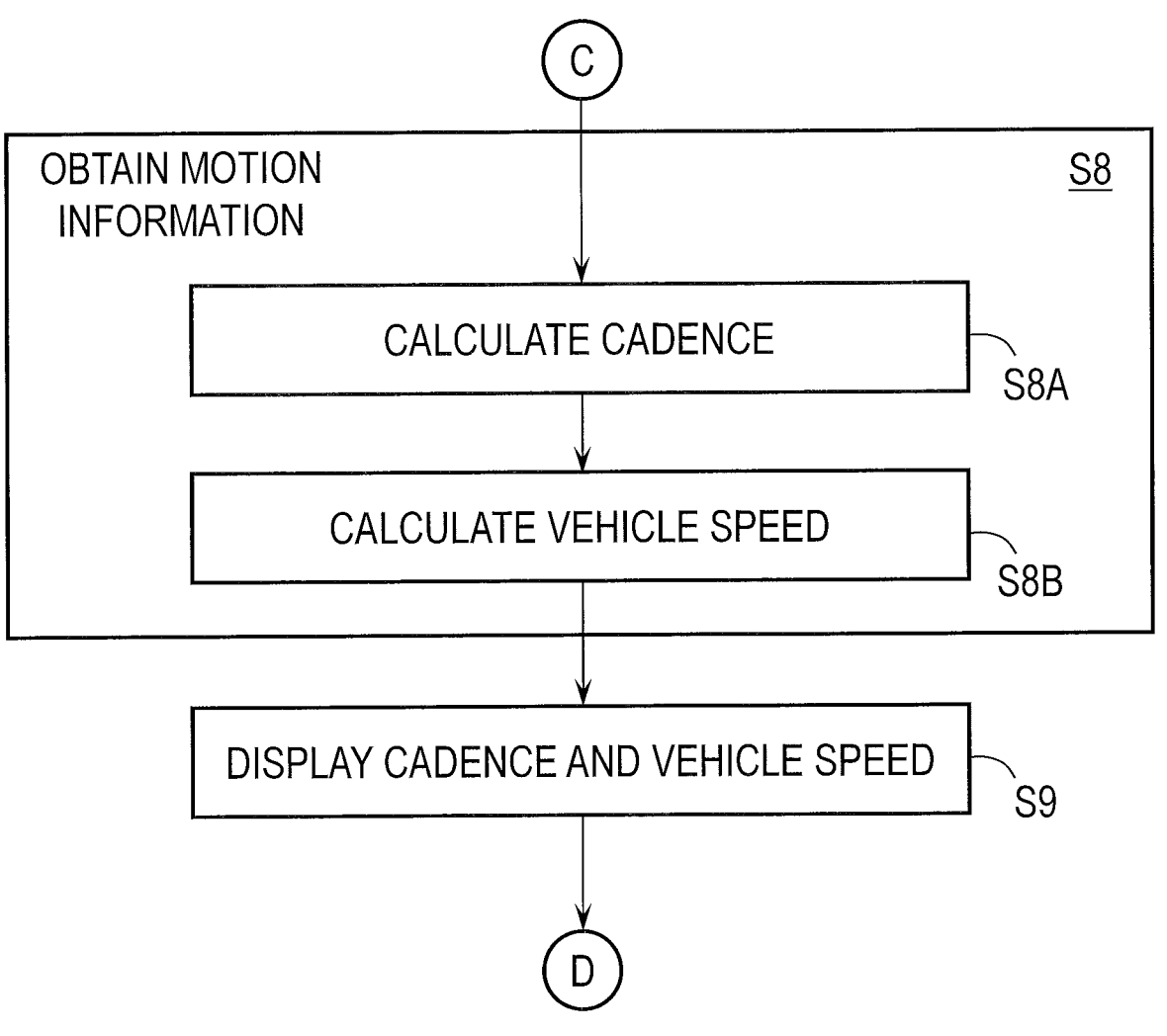

As seen in FIG. 7, in step S8, the motion information INF2 is obtained by the electronic controller circuitry EC1 based on the load information INF1. In step S8, the cadence and the vehicle speed are obtained by the electronic controller circuitry EC1 based on the load information INF1.

In step S8A, for example, the cadence is calculated by the electronic controller circuitry EC1 based on the load information INF1. For example, the cadence is calculated by the electronic controller circuitry EC1 based on the rear load information INF12. The cadence is calculated by the electronic controller circuitry EC1 based on the rear air pressure information INF14. The cadence can be calculated by the electronic controller circuitry EC1 based on the front air pressure information INF13 or both the front air pressure information and the rear air pressure information INF14.

For example, the cadence is calculated by the electronic controller circuitry EC1 based on the total number of peaks of the load information INF1 per unit time. The cadence is calculated by the electronic controller circuitry EC1 based on the total number of peaks of the rear load information INF12 per unit time. The cadence is calculated by the electronic controller circuitry EC1 based on the total number of peaks of the rear air pressure information INF14 per unit time. The half of the total number of peaks of the rear air pressure information INF14 per unit time is calculated as the cadence by the electronic controller circuitry EC1.

In step S8B, the vehicle speed is calculated by the electronic controller circuitry EC1 based on the load information INF1. For example, the vehicle speed is calculated by the electronic controller circuitry EC1 based on the rear load information INF12. The vehicle speed is calculated by the electronic controller circuitry EC1 based on the rear air pressure information INF14.

For example, the vehicle speed is calculated by the electronic controller circuitry EC1 based on the cadence calculated based on the rear air pressure information INF14. The vehicle speed is calculated by the electronic controller circuitry EC1 based on the cadence C, the current gear ratio G, the circumferential length L of the rear wheel RW, and the equation (1).

In step S9, the cadence and the vehicle speed are displayed by the display ED2. Thus, the user can recognize the cadence and the vehicle speed based on the motion information INF2 displayed by the display ED2. The process returns to step S1.

As seen in FIGS. 4 to 7, steps S4 to S9 are executed to obtain the motion information INF2. However, the steps S4 and S5 can be omitted from the flowchart depicted in FIGS. 4 to 7 if needed or desired. The steps S6 and S7 can be omitted from the flowchart depicted in FIGS. 4 to 7 if needed or desired. The steps S8 and S9 can be omitted from the flowchart depicted in FIGS. 4 to 7 if needed or desired.

In the flowchart depicted in FIGS. 4 to 7, the steps S4 to S7 are executed after receipt of the load information INF1. However, the steps S4 and S5 can be executed as a separate flowchart after the completion of collecting data of the load information INF1. The steps S6 and S7 can be executed as a separate flowchart after the completion of collecting data of the load information INF1.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A detection system comprising:
a load sensor configured to obtain load information relating to a load applied, while a rider rides a human-powered vehicle, to a wheel of the human-powered vehicle; and
electronic controller circuitry configured to obtain, based on the load information, motion information relating to a motion of the human-powered vehicle, wherein
the motion information includes a technical level of the rider, and
the electronic controller circuitry is configured to determine the technical level based on the load information.

2. The detection system according to claim 1, wherein
the load information includes air pressure information relating to an air pressure of the wheel,
the load sensor is configured to obtain the air pressure information, and
the electronic controller circuitry is configured to obtain the motion information based on the air pressure information.

3. The detection system according to claim 1, wherein
the technical level includes a level of a standstill technique that the rider maintains balance while the human-powered vehicle remains stationary or moves only minimal distances, and
the electronic controller circuitry is configured to determine the level of the standstill technique based on the load information.

4. The detection system according to claim 1, wherein
the technical level includes a level of a neutral technique that the rider absorbs a bump of a road to reduce shocks applied to the wheel while the rider rides the human-powered vehicle, and
the electronic controller circuitry is configured to determine the level of the neutral technique based on the load information.

5. The detection system according to claim 1, wherein
the load sensor includes a front load sensor and a rear load sensor,
the front load sensor is configured to obtain front load information relating to a front load applied, while the rider rides the human-powered vehicle, to a front wheel of the human-powered vehicle,
the rear load sensor is configured to obtain rear load information relating to a rear load applied, while the rider rides the human-powered vehicle, to a rear wheel of the human-powered vehicle, and
the electronic controller circuitry is configured to determine the technical level based on at least one of the front load information and the rear load information.

6. The detection system according to claim 5, wherein
the electronic controller circuitry is configured to determine the technical level based on a load difference between the front load information and the rear load information.

7. The detection system according to claim 6, wherein
the electronic controller circuitry is configured to determine the technical level based on a change in the load difference.

8. The detection system according to claim 7, wherein
the electronic controller circuitry is configured to calculate standard deviation of the load difference, and
the electronic controller circuitry is configured to determine the technical level based on the standard deviation.

9. The detection system according to claim 8, wherein
the technical level includes a first technical level and a second technical level,
the electronic controller circuitry is configured to select the first technical level in a case where the standard deviation is less than a first level threshold, and
the electronic controller circuitry is configured to select the second technical level in a case where the standard deviation is greater than the first level threshold.

10. The detection system according to claim 1, wherein
the electronic controller circuitry is configured to determine the technical level based on a change in the load information.

11. The detection system according to claim 10, wherein
the load sensor includes at least one of a front load sensor and a rear load sensor,
the front load sensor is configured to obtain front load information relating to a front load applied, while the rider rides the human-powered vehicle, to a front wheel of the human-powered vehicle,
the rear load sensor is configured to obtain rear load information relating to a rear load applied, while the rider rides the human-powered vehicle, to a rear wheel of the human-powered vehicle, and the electronic controller circuitry is configured to determine the technical level based on at least one of a change in the front load information, and a change in the rear load information.

12. The detection system according to claim 10, wherein the technical level includes a first technical level and a second technical level, the electronic controller circuitry is configured to select the first technical level in a case where the change in the load information is less than a second level threshold, and the electronic controller circuitry is configured to select the second technical level in a case where the change in the load information is greater than the second level threshold.

13. The detection system according to claim 1, wherein the motion information includes at least one of a cadence and a vehicle speed of the human-powered vehicle, and the electronic controller circuitry is configured to calculate at least one of the cadence and the vehicle speed based on the load information.

14. The detection system according to claim 13, wherein the load sensor includes a rear load sensor configured to obtain rear load information relating to a rear load applied, while the rider rides the human-powered vehicle, to a rear wheel of the human-powered vehicle, and the electronic controller circuitry is configured to calculate at least one of the cadence and the vehicle speed based on the rear load information.

15. The detection system according to claim 14, wherein the rear load information includes rear air pressure information relating to a rear air pressure of the rear wheel, the rear load sensor is configured to obtain the rear air pressure information, and the electronic controller circuitry is configured to calculate at least one of the cadence and the vehicle speed based on the rear air pressure information.

16. The detection system according to claim 13, wherein the electronic controller circuitry is configured to calculate at least one of the cadence and the vehicle speed based on a change in the load information.

17. The detection system according to claim 13, wherein the electronic controller circuitry is configured to calculate at least one of the cadence and the vehicle speed based on a total number of peaks of the load information per unit time.

18. A detection method comprising:

obtaining load information relating to a load applied, while a rider rides a human-powered vehicle, to a wheel of the human-powered vehicle; and obtaining, based on the load information, motion information relating to a motion of the human-powered vehicle, wherein the motion information includes a technical level of the rider, and the technical level is determined based on the load information.

19. A computer-readable storage medium storing program instructions for causing electronic controller circuitry to execute a detection method comprising:

obtaining load information relating to a load applied, while a rider rides a human-powered vehicle, to a wheel of the human-powered vehicle; and obtaining, based on the load information, motion information relating to a motion of the human-powered vehicle, wherein the motion information includes a technical level of the rider, and the technical level is determined based on the load information.

\* \* \* \* \*